United States Patent
Hayes et al.

(10) Patent No.: US 7,124,132 B1
(45) Date of Patent: Oct. 17, 2006

(54) DOMAIN SPECIFICATION SYSTEM FOR AN LDAP ACI ENTRY

(75) Inventors: Terry N. Hayes, Los Altos, CA (US); Prasanta Behera, Fremont, CA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 10/276,586

(22) PCT Filed: May 17, 2000

(86) PCT No.: PCT/US00/13710

§ 371 (c)(1),
(2), (4) Date: Nov. 15, 2002

(87) PCT Pub. No.: WO01/89177

PCT Pub. Date: Nov. 22, 2001

(51) Int. Cl.
*G06F 17/30* (2006.01)

(52) U.S. Cl. .............. 707/9; 707/3; 707/10; 707/104.1

(58) Field of Classification Search ............. 707/1–3, 707/9–10, 100–102, 104.1
See application file for complete search history.

(56) References Cited

U.S. PATENT DOCUMENTS

| | | | |
|---|---|---|---|
| 6,453,353 B1 * | 9/2002 | Win et al. .................... | 709/229 |
| 6,591,260 B1 * | 7/2003 | Schwarzhoff et al. .......... | 707/2 |
| 6,715,145 B1 * | 3/2004 | Bowman-Amuah ......... | 718/101 |
| 6,732,100 B1 * | 5/2004 | Brodersen et al. ............. | 707/9 |
| 6,873,975 B1 * | 3/2005 | Hatakeyama et al. ......... | 705/51 |

OTHER PUBLICATIONS

International Telecommunication Union (ITU-T); Telecommunication standarization sector of ITU "Information technology open systems interconnection—the dirctory models" X.501; Nov. 1993; pp. 1-80.*
Command Line Method for Managing Access Control Profiles for Aliases; IBM Technical Bulletin.
Creating and Changing Smart Referrals.
Information Technology—Open Systems Interconnectioon—The Directory: Models; ITU.

* cited by examiner

*Primary Examiner*—Debbie M. Le
(74) *Attorney, Agent, or Firm*—Michael A. Glenn; Glenn Patent Group

(57) ABSTRACT

A domain specification system for an LDAP ACI entry provides a system for specifying an ACI domain entry in an access control command line that controls access to a resource. The access control command specifies resources using a Universal Resource Locator (URL) format that contains the name of the resource. A target scope value specifies the scope of access to be granted to a user which can be limited to a single entry, a subtree, or a single level. A search filter is part of the resource specification. The ACI applies only to entries in the subtree rooted at the resource name that match the filter. A list of attributes is also contained in the resource specification and the ACI applies only to attributes in the resource that are named in the list. The access control command specifies the type of access to be granted to a user which includes, but is not limited to: deny, read, write, and any other privileges that the system supports. The access control command also specifies the required user attributes for access to a resource. The directory server matches the required attributes with the accessing user's attributes and grants the type of access listed only if the user has the required attributes.

20 Claims, 1 Drawing Sheet

DOMAIN SPECIFICATION SYSTEM FOR AN LDAP ACI ENTRY

BACKGROUND OF THE INVENTION

1. Technical Field

The invention relates to accessing resources in a directory structure in a computer environment. More particularly, the invention relates to controlling access to resources within an LDAP directory structure in a computer environment.

2. Description of the Prior Art

A Lightweight Directory Access Protocol (LDAP) directory (such as Netscape Communications Corporation's Directory Server) is a collection of "entries." Each entry has a name (called the Distinguished Name) and a list of attribute values. The entries in a directory are organized in a tree structure, with major groupings that are subdivided into smaller units. A directory might contain several organization entries, each of which contains several organizationalUnit entries. These entries can be further subdivided.

LDAP provides search operations that can be performed over specified portions of the directory tree. Trees and subtrees, therefore, are a natural way to deal with data stored in an LDAP directory.

Entries and attributes correspond to a wide variety of data types such as personnel information, server configuration, business relationships, and user preferences. Since all entries contain important information, a method is required to restrict the availability of specific information to authorized users.

The Netscape Directory Server allows an ACI entry to be created which controls access to data stored in the directory tree. The ACI entry contains rules to determine which users of the directory should be allowed to have access. One of the components of the ACL rule is a description of which entries the rule applies to. The entry is essentially a resource specification (e.g., data, printers, servers, etc.).

The method used to control access in an LDAP system is via Access Control Lists (ACL). The Directory Server Administrator (DSAdmin) creates basic ACL rules that grant specific users access to entries in the directory.

Previous methods required the DSAdmin to specify separate attributes in the command line for a resource which was cumbersome and confusing. An additional problem with previous approaches was that the DSAdmin could not restrict the affect of the ACI to a single node or single level of nodes.

It would be advantageous to provide a domain specification system for an LDAP ACI entry that gives the system administrator the ability to easily specify resources that are accessible by a user. It would further be advantageous to provide an domain specification system for an LDAP ACL rule that allows the system administrator to restrict a user's access to a single node or single level of nodes.

SUMMARY OF THE INVENTION

The invention provides a domain specification system for an LDAP ACL rule. The system allows a system administrator to specify and control access to directory resources by specifying the resource using an easily understood standardized format. In addition, the invention provides a system that allows the system administrator to restrict a user's access to a single node or single level of nodes.

A preferred embodiment of the invention provides a system for specifying an ACI domain entry in an access control command line that controls access to a resource. The access control command specifies resources using a Universal Resource Locator (URL) format.

The resource specification contains the name of the resource. A target scope value specifies the scope of access to be granted to a user. The scope can be limited to a single entry, a subtree, or a single level.

A search filter is part of the resource specification. The ACL applies only to entries in the subtree rooted at the resource name that match the filter. A list of attributes is also contained in the resource specification and the ACL applies only to attributes in the resource that are named in the list.

The access control command specifies the type of access to be granted to a user which includes, but is not limited to: read, write, and any other privileges that the system supports.

The access control command also specifies the required user attributes or credentials for access to a resource. The directory server matches the required attributes with the accessing user's attributes and grants the type of access listed only if the user has the required attributes.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in an domain specification system for an LDAP ACI entry in a computer environment. A system according to the invention allows a system administrator to specify and control access to directory resources by specifying the resource using an easily understood standardized format. In addition, the invention provides a system that allows the system administrator to restrict a user's access to a single node or single level of nodes.

A Lightweight Directory Access Protocol (LDAP) directory (such as Netscape Communications Corporation's Directory Server) is a collection of "entries." Each entry has a name (called the Distinguished Name) and a list of attribute values. The entries in a directory are organized in a tree structure, with major groupings that are subdivided into smaller units. A directory might contain several organization entries, each of which contains several organizationalUnit entries. These entries can be further subdivided.

LDAP provides search operations that can be performed over specified portions of the directory tree. Trees and subtrees, therefore, are a natural way to deal with data stored in an LDAP directory.

Entries and attributes correspond to a wide variety of data types such as personnel information, server configuration, business relationships, and user preferences. Since all entries are stored within a single directory, a method is required to restrict the availability of specific information to authorized users.

The Netscape Directory Server allows an ACI attribute to be created which controls access to data stored in the directory tree. The ACI attribute contains rules to determine which users of the directory should be allowed to have access.

Figure 1:
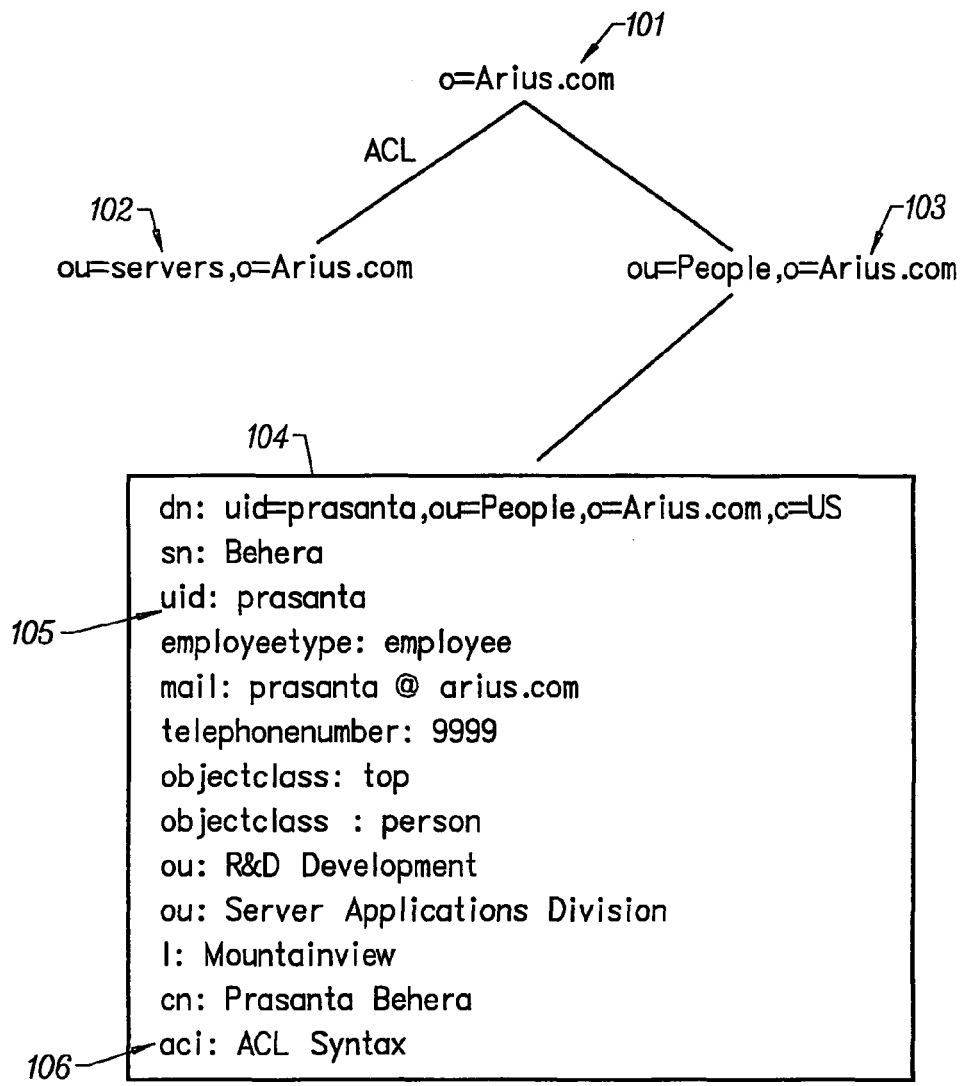
FIG. 1 is a diagram of an LDAP directory structure according to the invention.

Referring to FIG. 1, a simple LDAP directory structure is shown. The organization designation (o=Arius.com) 101 is at the root of the directory structure. Here, the directory structure contains a server subtree 102 and people subtree 103. Under each subtree are multiple related entries. In this example, a typical user entry 104 contains the user's information such as the user's name (here uid=prasanta) 105.

The method used to control access in an LDAP system is via Access Control Lists (ACL). The Directory Server Administrator (DSAdmin) creates basic ACL rules that grant specific users access to entries in the directory. The ACI entry 106 in the user's entry 104 specifies resources that the user has access to by using ACL syntax.

Current Products

Previous approaches required three separate values to specify the domain of an ACI entry:
   target
   targetfilter
   targetattrs Target The name (Distinguished Name) of one of the LDAP entries. The ACI rule will apply to all entries in the subtree rooted at the specified entry.

Targetfilter

Specifies a standard LDAP search filter. The ACI rule will apply only to entries (as restricted by target) which match the filter.

Targetattrs

Specifies a list of attributes. The ACI rule will apply only to the named attributes with the directory entries.

The DSAdmin had to specify each of the values in a command line. For example:
   aci: (target="o=Arius.com")(targetattr="cn, sn, mail, uid")(targetfilter=(position>level2))allow(read) user=joe However, the problem with the previous approaches was that the DSAdmin could not restrict the affect of the ACI to a single node or single level of nodes. Additionally, three separate values must be specified for the ACI, which is confusing.

A preferred embodiment of the invention adds a value called Targetscope that allows the ACI to be restricted to a more specific range. The ACI command line is also specified in an LDAP URL format, thereby standardizing the command line format.

Targetscope

One of the values BASE, SUB and ONE is specified. These values have the same meaning as defined for LDAP search operations (as specified by the Internet Engineering Task Force (IETF)) and define the scope of access (i.e., one entry, one level, or an entire subtree). The ACI entry will be restricted to the same set of entries as would be considered in an LDAP search.

A preferred embodiment of the invention improves the specification of the domain by allowing the user to apply the ACI rules to a single entry, entries at the next level of the tree only, or the entire subtree. Previous approaches could specify only the entire subtree. Various schemes for filtering the entries within the subtree have been used to approximate the results of the invention's targetscope method. However, none of the prior approaches can exactly match the invention's results.

Unifying the Rules: LDAP URL

The invention uses the LDAP Universal Resource Locator (URL) format to include all four components of the domain specification. An LDAP URL specification looks like:
   ldap://<serverspec>/
   <baseDN>?<attributes>?<scope>?<filter>

When the LDAP URL applies to the current server, the <serverspec> portion is left empty. To describe the domain of an ACI, the other fields are filled with the data from the four values specified above. The URL form becomes:
   ldap:///
   <target>?<targetattrs>?<targetscope>?<targetfilter>

The invention improves over previous approaches by bringing the complete description of the domain into a standard form which is already familiar to users.

Using the example above, the URL resource specification using all four values is as follows:
   aci: (target=ldap://o=Arius.com?cn.sn.mail.uid?SUB? (position>level2))allow(read)user=joe This follows the format:
   aci: <resource><ALLOW/DENY><rights><condition>
   where:
   rights=read, write, or any other privileges that the system recognizes.
   condition=the attribute requirements for user access.

Figure 2:
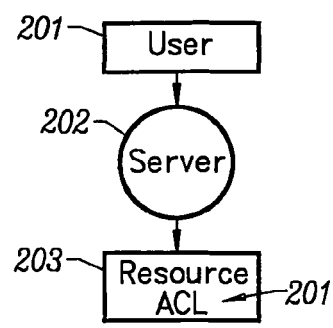
FIG. 2 is a block schematic diagram of an example of server interaction with user ACI rules and system resources according to the invention.

With respect to FIG. 2, the Server 202 checks the ACI rule 201 for the resource when the user attempts access to a resource 203. The condition attributes are checked against the current user. If the ACI specification 201 allows the user access, then the Server 202 grants access to the resource 203.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for specifying an ACI domain entry that controls access to a resource in a computer environment, comprising the steps of:

providing an access control command that is capable of being defined by a system administrator;

said access control command specifies the name of said resource, wherein said resource is in a directory structure;

said access control command lists a target scope value;

wherein said target scope value specifies the scope of access to be granted to a user and allows said ACI domain entry to be restricted to a specific range, wherein said range comprises a node;

wherein said access control command specifies the type of access to be granted to a user;

wherein said access control command is expressed in an LDAP Universal Resource Locator (URL) standardized format in an ACI rule;

wherein said specific range specifies a portion of a tree structure;

wherein said access control command specifies the required user attributes for access to said resource; and wherein a directory server matches said required attributes with the accessing user's attributes and grants said type of access only if the user has said required attributes.

2. The process of claim 1, wherein said type of access includes, but is not limited to: deny, read, write, and any other privileges that the system supports.

3. The process of claim 1, wherein said target scope value specifies one of the values: BASE, SUB, or ONE.

4. The process of claim 1, wherein said access control command specifies a search filter; and wherein said access command applies only to entries that match said filter.

5. The process of claim 1, wherein said access control command specifies a list of attributes; and wherein said access control command applies only to attributes in said resource that are listed in said list.

6. An apparatus for specifying an ACI domain entry that controls access to a resource in a computer environment, comprising:
an access control command that is capable of being defined by a system administrator;
said access control command specifies the name of said resource, wherein said resource is in a directory structure;
said access control command lists a target scope value;
wherein said target scope value specifies the scope of access to be granted to a user and allows said ACI domain entry to be restricted to a specific range, wherein said range comprises a single node;
wherein said access control command specifies the type of access to be granted to a user;
wherein said access control command is expressed in an LDAP Universal Resource Locator (URL) standardized format in an ACI rule;
wherein said specific range specifies a portion of a tree structure;
wherein said access control command specifies the required user attributes for access to said resource; and
wherein a directory server matches said required attributes with the accessing user's attributes and grants said type of access only if the user has said required attributes.

7. The apparatus of claim 6, wherein said type of access includes, but is not limited to: deny, read, write, and any other privileges that the system supports.

8. The apparatus of claim 6, wherein said target scope value specifies one of the values: BASE, SUB, or ONE.

9. The apparatus of claim 6, wherein said access control command specifies a search filter; and wherein said access command applies only to entries that match said filter.

10. The apparatus of claim 6, wherein said access control command specifies a list of attributes; and wherein said access control command applies only to attributes in said resource that are listed in said list.

11. A program storage medium readable by a computer, tangibly embodying a program of instructions executable by the computer to perform method steps for specifying an ACI domain entry that controls access to a resource in a computer environment, comprising the steps of:
providing an access control command that is capable of being defined by a system administrator;
said access control command specifies the name of said resource, wherein said resource is in a directory structure;
said access control command lists a target scope value;
wherein said target scope value specifies the scope of access to be granted to a user and allows said ACI domain entry to be restricted to a specific range, wherein said range comprises a single level of nodes;
wherein said access control command specifies the type of access to be granted to a user;
wherein said access control command is expressed in an LDAP Universal Resource Locator (URL) standardized format in an ACI rule;
wherein said specific range specifies a portion of a tree structure;
wherein said access control command specifies the required user attributes for access to said resource; and
wherein a directory server matches said required attributes with the accessing user's attributes and grants said type of access only if the user has said required attributes.

12. The method of claim 11, wherein said type of access includes, but is not limited to: deny, read, write, and any other privileges that the system supports.

13. The method of claim 11, wherein said target scope value specifies one of the values: BASE, SUB, or ONE.

14. The method of claim 11, wherein said access control command specifies a search filter; and wherein said access command applies only to entries that match said filter.

15. The method of claim 11, wherein said access control command specifies a list of attributes; and wherein said access control command applies only to attributes in said resource that are listed in said list.

16. The process of claim 1, wherein said node comprises a single node.

17. The process of claim 1, wherein said node comprises a single level of nodes.

18. The process of claim 1, wherein said portion of said tree structure comprises an entire subtree of said tree structure.

19. The process of claim 4, wherein said specific range comprises a portion of a subtree structure of said directory structure that matches said search filter.

20. The apparatus of claim 6, wherein said portion of said tree structure comprises a next level of said tree structure.

* * * * *